(12) United States Patent
Reece, II

(10) Patent No.: US 11,428,571 B2
(45) Date of Patent: Aug. 30, 2022

(54) MONO-PLANAR SEALED BEAM ALIGNMENT DEVICE

(71) Applicant: SAUDI ARABIAN OIL COMPANY, Dhahran (SA)

(72) Inventor: John Duclos Reece, II, Al Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/380,858

(22) Filed: Jul. 20, 2021

(65) Prior Publication Data
US 2022/0026265 A1    Jan. 27, 2022

Related U.S. Application Data

(60) Provisional application No. 63/054,488, filed on Jul. 21, 2020.

(51) Int. Cl.
  *G01J 1/42*   (2006.01)
  *G01J 1/04*   (2006.01)

(52) U.S. Cl.
  CPC .......... *G01J 1/0403* (2013.01); *G01J 1/4257* (2013.01)

(58) Field of Classification Search
  CPC .... G01J 1/04; G01J 1/42; G02B 27/62; G02B 7/00
  USPC .................................. 250/239, 216
  See application file for complete search history.

(56) References Cited

U.S. PATENT DOCUMENTS

| 5,644,137 A * | 7/1997 | Waggener ............... H01J 37/20 250/442.11 |
| 2002/0126399 A1 | 9/2002 | Takanashi et al. |
| 2020/0003987 A1 | 1/2020 | Kovacs |

OTHER PUBLICATIONS

International Search Report and Written Opinion issued in Application No. PCT/US2021/042337, dated Nov. 8, 2021 (12 pages).

* cited by examiner

*Primary Examiner* — Que Tan Le
(74) *Attorney, Agent, or Firm* — Osha Bergman Watanabe & Burton LLP

(57) ABSTRACT

A mono-planar sealed laser beam alignment device may include a plurality of fasteners holding an upper plate. The device further includes an upper O-ring, a lower O-ring, an inner motion plane, and an outer motion plane. The device further includes a main housing affixed to a laser beam alignment assembly. The laser beam alignment device is configured to provide laser beam alignment with respect to a first axis and a second axis opposed at 90 degrees to the first axis of the laser beam alignment assembly. The first axis and the second axis on a single plane are normal to an optical axis of a laser beam of the laser beam alignment assembly. The plurality of fasteners secure the upper O-ring, the inner motion plane, the lower O-ring, and the outer motion plane into the main housing, creating beam path pressurization by the laser beam alignment device.

20 Claims, 7 Drawing Sheets

MONO-PLANAR SEALED BEAM ALIGNMENT DEVICE

BACKGROUND OF INVENTION

Field of the Invention

The invention generally relates to a laser beam alignment device. More specifically, the invention relates to the laser beam alignment device using advanced machining techniques, resulting in a lightweight assembly that occupies very little space in the optical head stack.

Background Art

An important aspect for optimal working of a laser machine is to have the alignment correct. A known laser beam alignment setup is multi-planar, or consists of two or more laser beam alignment assemblies. The laser beam alignment assemblies are fitted or fastened together, which result in increasing part count and complexity. Even in the most sophisticated setup, there is a possibility of introducing potential angular misalignment due to stacking on multiple laser beam alignment assemblies to develop the plurality of movement directions.

In addition, the multi-planar laser beam alignment setup has significantly greater thickness along the beam axis and increased weight due to increased part count and complexity.

SUMMARY OF INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a mono-planar sealed laser beam alignment device that includes a plurality of fasteners holding an upper plate. The device further includes an upper O-ring, a lower O-ring, an inner motion plane, and an outer motion plane. The device further includes a main housing affixed to a laser beam alignment assembly. The laser beam alignment device is configured to provide laser beam alignment with respect to a first axis and a second axis opposed at 90 degrees to the first axis of the laser beam alignment assembly. The first axis and the second axis on a single plane are normal to an optical axis of a laser beam of the laser beam alignment assembly. The plurality of fasteners secure the upper O-ring, the inner motion plane, the lower O-ring, and the outer motion plane into the main housing, creating beam path pressurization by the laser beam alignment device.

In general, in one aspect, embodiments relate to a laser beam alignment assembly that includes a laser diode with a laser control to control a laser beam, a plurality of focusing lenses, a data acquisition system, a computing system coupled to the data acquisition system, and a laser beam alignment device coupled to a detector, an amplifier with a resonant filter, and the data acquisition system. The laser beam alignment device may include a plurality of fasteners holding an upper plate. The device further includes an upper O-ring, a lower O-ring, an inner motion plane, and an outer motion plane. The device further includes a main housing affixed to a laser beam alignment assembly. The laser beam alignment device is configured to provide laser beam alignment with respect to a first axis and a second axis opposed at 90 degrees to the first axis of the laser beam alignment assembly. The first axis and the second axis on a single plane are normal to an optical axis of a laser beam of the laser beam alignment assembly. The plurality of fasteners secure the upper O-ring, the inner motion plane, the lower O-ring, and the outer motion plane into the main housing, creating beam path pressurization by the laser beam alignment device.

In general, in one aspect, embodiments relate to a method for a laser beam alignment assembly using a laser beam alignment device. The method includes affixing a main housing of the laser beam alignment device to the laser beam alignment assembly to provide laser beam alignment of a laser beam with respect to a first axis and a second axis opposed at 90 degrees to the first axis of the laser beam alignment assembly. The method further includes adjusting an affixed laser beam axis and maintaining the affixed laser beam axis parallel to a mechanical axis of the laser beam alignment assembly. The method further includes setting a pre-compression force along with the first axis and the second axis of the laser beam alignment assembly, using a plurality of translation setscrews, a corresponding plurality of motion springs of the translation setscrews with opposing motions and spring retainers. The method further includes mechanically nesting an inner motion plane of the laser beam alignment device and an outer motion plane of the laser beam alignment device together into the main housing by corresponding machined surfaces, such that each of the inner and outer motion planes operates in a fixed orientation that is 90 degrees apart relative to a single plane normal to an optical axis of the laser beam alignment assembly.

Other aspects and advantages of the invention will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

Like elements in the various figures are denoted by like reference numerals for consistency.

DETAILED DESCRIPTION

Figure 1:
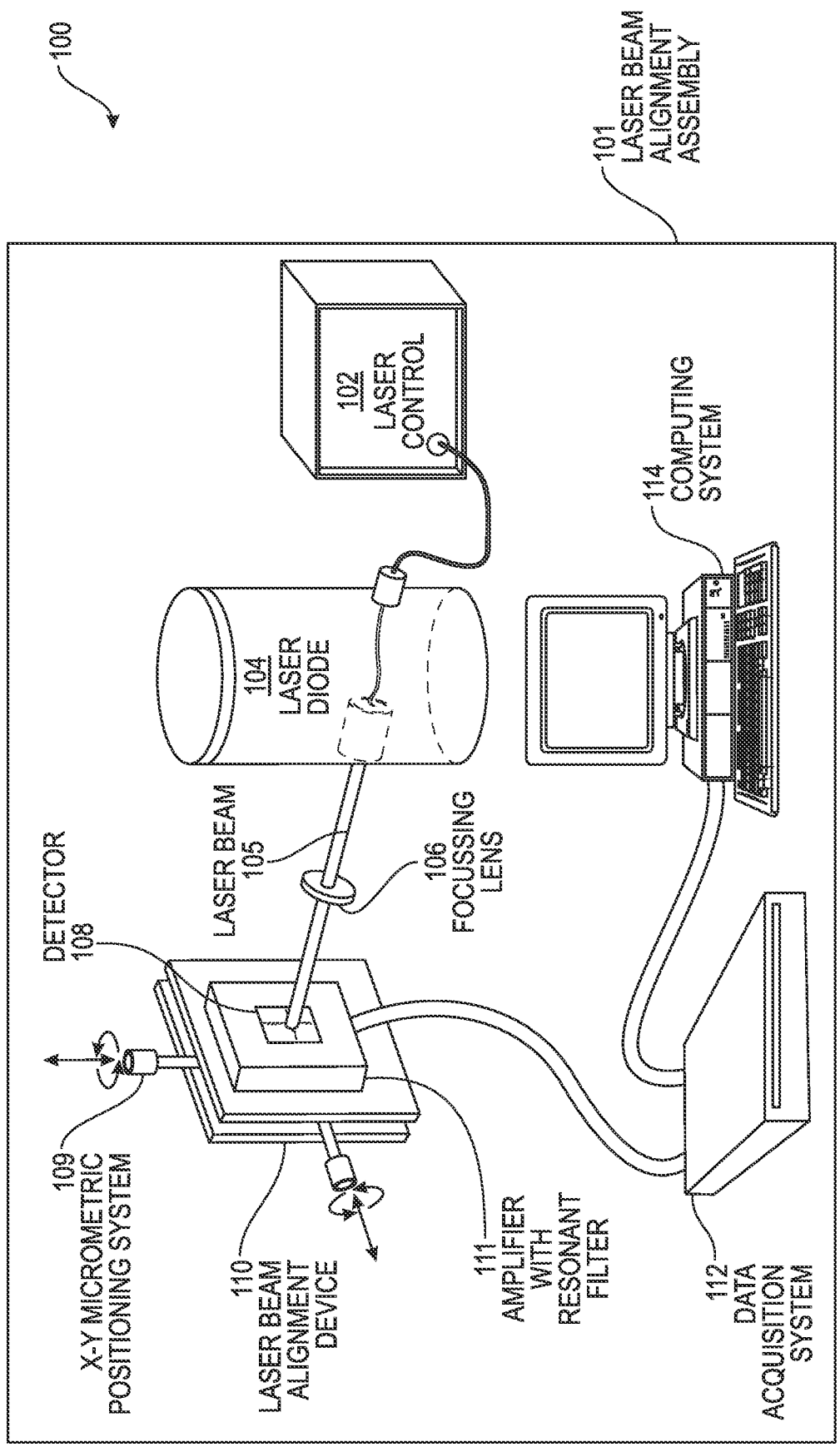
FIG. 1 shows a system in accordance with one or more embodiments.

Specific embodiments of the disclosure will now be described in detail with reference to the accompanying figures.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope of the invention should not be considered limited to the specific arrangement of steps shown in the flowcharts.

Although multiply dependent claims are not introduced, it would be apparent to one of ordinary skill that the subject matter of the dependent claims of one or more embodiments may be combined with other dependent claims.

In general, one or more embodiments are directed a laser beam alignment device designed to align a laser beam in a laser beam alignment assembly. In particular, the laser beam alignment device may incorporates at least two separate motion planes, and in some instances two separate single-axis motion devices, resulting in a mechanically thicker assembly. Therefore, an object of embodiments disclosed herein is to provide an improved laser beam alignment device resulting in a lightweight assembly configured for beam alignment functionality.

Another object is to provide the improved laser beam alignment device which allows adjustments of the laser beam in two directions simultaneously, minimizing both design complexity and overall height of the laser beam alignment device. Another object is to provide the improved laser beam alignment device to provide a large clear beam aperture relative to the overall dimensions of the laser beam alignment device and to allow beam path pressurization. Embodiments of the invention may be used in any laser beam alignment assembly to which the laser beam alignment device may be attached.

FIG. 1 shows a laser beam alignment system in accordance with one or more embodiments.

In one or more embodiments exemplified by FIG. 1, a system (100) with a laser beam alignment assembly (101) includes a laser control (102), a laser diode (104) emitting a laser beam (105), a focusing lens (106), a detector (108), and a laser beam alignment device (110) with an X-Y micrometric positioning system (109). The laser beam alignment assembly (101) may further include an amplifier with a resonant filter (111). In one or more embodiments, the laser beam alignment device (110) is coupled to the detector (108) and the amplifier with the resonant filter (111) and further coupled to a data acquisition system (112). A computing system (114) is coupled to the data acquisition system (112). The laser control (102) includes a power supply and is used to control the laser power of the laser beam (105) emitted by the laser diode (104) by way of changing an impulse duration or changing the voltage on an output slot.

In one or embodiments, the laser diode (104) is a semiconductor device which can directly convert electric energy into light and uses p-n junction to emit coherent light in which all the waves are at the same frequency and phase. In particular, a diode is pumped directly with electric current to create lasing conditions at the diode junction. The choice of the semiconductor material determines the wavelength of the emitted beam, which results in laser diodes ranging from infrared to the UV spectrum. While the above example is described with respect a general laser diode in general, those skilled in the art will appreciate that the invention is not limited to this particular type of laser diode (104), and any suitable type of laser diodes (for example, double heterostructure lasers, quantum well lasers, quantum cascade lasers, interband cascade lasers, distributed Bragg reflector lasers, vertical-cavity surface-emitting laser, vertical-external-cavity surface-emitting laser, external-cavity diode lasers) may be used.

The focusing lens (106) is an optical component for the laser beam alignment assembly (101) to focus the laser beam (105) to a small spot which is detected by the detector (108) for measuring a minimum spot size in a desired target position and beam direction. In some embodiments, a plurality of focusing lenses align the laser beam (105) by controlling an angular and a translational displacement of the laser beam (105). In one or more embodiments, the detector (108) is a four-quadrant detector which is a silicon photo detector with four active photodiode areas. These detectors have the ability to measure extremely small changes in the position of the laser beam (105) and are used for centering, nulling, detecting, and measuring position displacements in the laser beam alignment assembly.

In one or more embodiments, the laser beam (105) is pointed towards the dead center between the four quadrants and a beam diameter is selected to fit inside of the total quadrant area. Although light falls on all four quadrants of the detector (108), a difference between the left and right quadrants (X output) and top and bottom quadrants (Y output) may be adjusted to zero by centering the beam, whereas a sum of X output and Y output is at a maximum. The device X and Y output voltages thereby become very sensitive to slight deviations in the position of the laser beam from this initial centered setting. The sum value on the other hand can be used to measure changes in the laser beam intensity, so this can be used to correct the X and Y output values for voltage changes that are due to intensity fluctuations rather than actual beam deviations. In some embodiments, the individual quadrant outputs of the detector (108) is first amplified and then combined using a series of the amplifier with the resonant filter (111).

In some embodiments, the laser beam alignment device (110) is a device configured to align the laser beam (105) along a plane created normal to an axis of the laser beam (105). The laser beam alignment device may be affixed (for example, mechanically affixed) to the laser beam alignment assembly (101) of FIG. 1. In one or more embodiments, the laser beam alignment device (110) may incorporate at least two separate motion planes, and in some instances two separate single-axis motion laser beam alignment devices. In some embodiments, the laser beam alignment device (110) may allow adjustments in two directions simultaneously with precise positioning movements using the X-Y micrometric positioning system (109). Details of the laser beam alignment device are discussed below with respect to FIGS. 2-4 and the accompanying description.

Continuing with FIG. 1, in one or more embodiments, the data acquisition system (112) is used as an information system to collect, store and distribute measurement data of the laser beam alignment assembly (101). In some embodiments, the data acquisition system (112) includes a suite of different tools and technologies that are designed to accumulate data. The data acquisition system (112) generally consists of the data acquisition software and hardware along with sensors and actuators, and generally require underlying network support for data communication between the data acquisition hardware and software.

In one or more embodiments, the hardware of the data acquisition system typically consists of components in the form of external expansion cards. The data acquisition system (112) is further coupled to the computing system (114) through a communication interface such as a Personal Computer Interface (PCI) or Universal Serial Bus (USB), or can be directly installed onto a motherboard of the computing system (114) described with regard to FIGS. 6A and 6B and the accompanying description. The hardware may be connected with an input device such as a 3-D scanner or analog-to-digital converter. The signal from the input device is sent to the hardware device/card, which processes and sends it to the data acquisition system, where it is recorded for further review and analysis.

Those skilled in the art will appreciate that while FIG. 1 shows a laser beam alignment assembly (101) with various components, the laser beam alignment device may be affixed to any suitable assembly which may or may not include each component shown in the assembly of FIG. 1.

Figure 2:
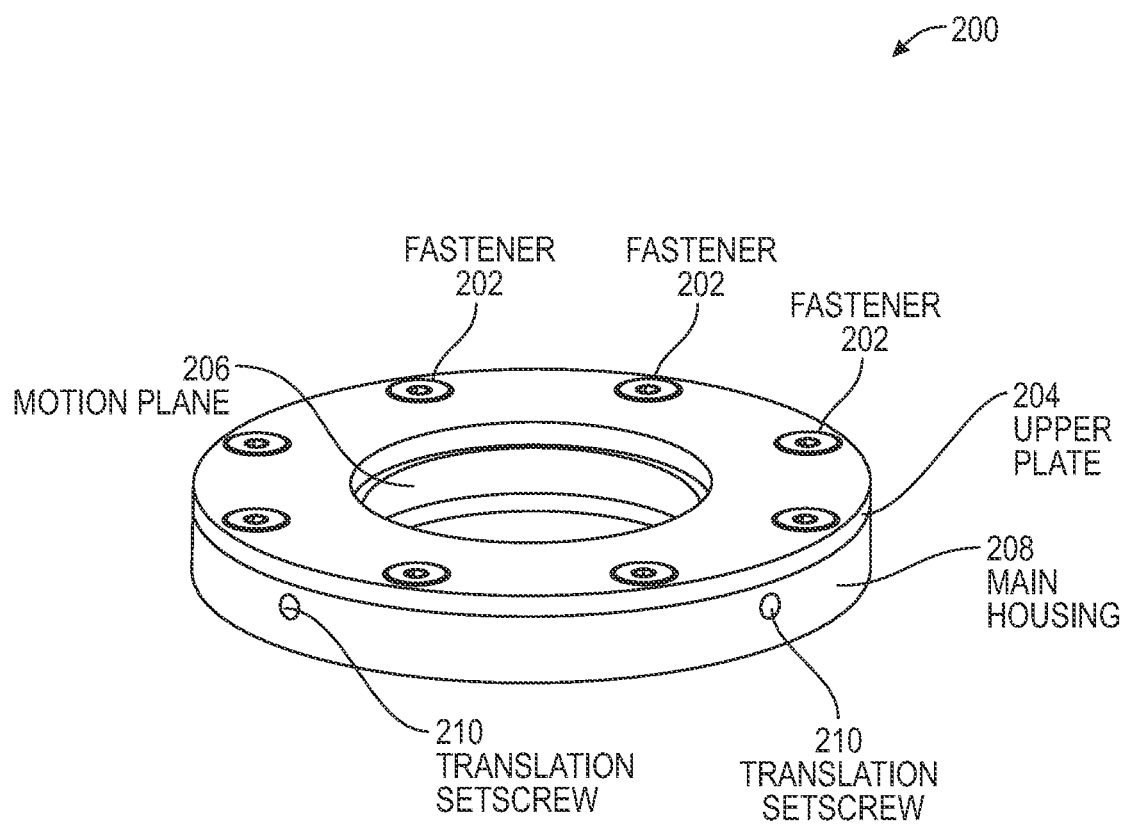
FIG. 2 shows a device in accordance with one or more embodiments.

FIG. 2 illustrates a compact view of a laser beam alignment device (200) in accordance with one or more embodiments. In FIG. 2, the laser beam alignment device (200) is shown in an assembled state. The laser beam alignment device (200) comprises a plurality of fasteners (202), an upper plate (204), a motion plate (206), a main housing (208), and a plurality of translation setscrews (210). In one or more embodiments, the main housing (208) of the laser beam alignment device (200) is affixed to the laser beam alignment assembly (101) of FIG. 1.

In one or more embodiments, the laser beam alignment device (200) is a mono-planar sealed beam alignment device, configured to provide a method of laser beam alignment in two different axes that are opposed at 90 degrees to each other, both axes on a single plane created normal to the axis of the laser beam of the laser beam assembly (101) in FIG. 1. In one or more embodiments, the laser beam alignment device (200) is produced using advanced machining techniques, resulting in a lightweight assembly with keyed & nested rings that occupies very little space in an optical head stack. The laser beam alignment device (200) may be operated via means of one threaded setscrew (210) per axis, coupled with opposing spring pressure, or the device (200) be assembled using two opposed setscrews (210) for maximum stability in a desired position. Details of each of the components shown in FIG. 2 are described below with respect to FIG. 3.

Figure 3:
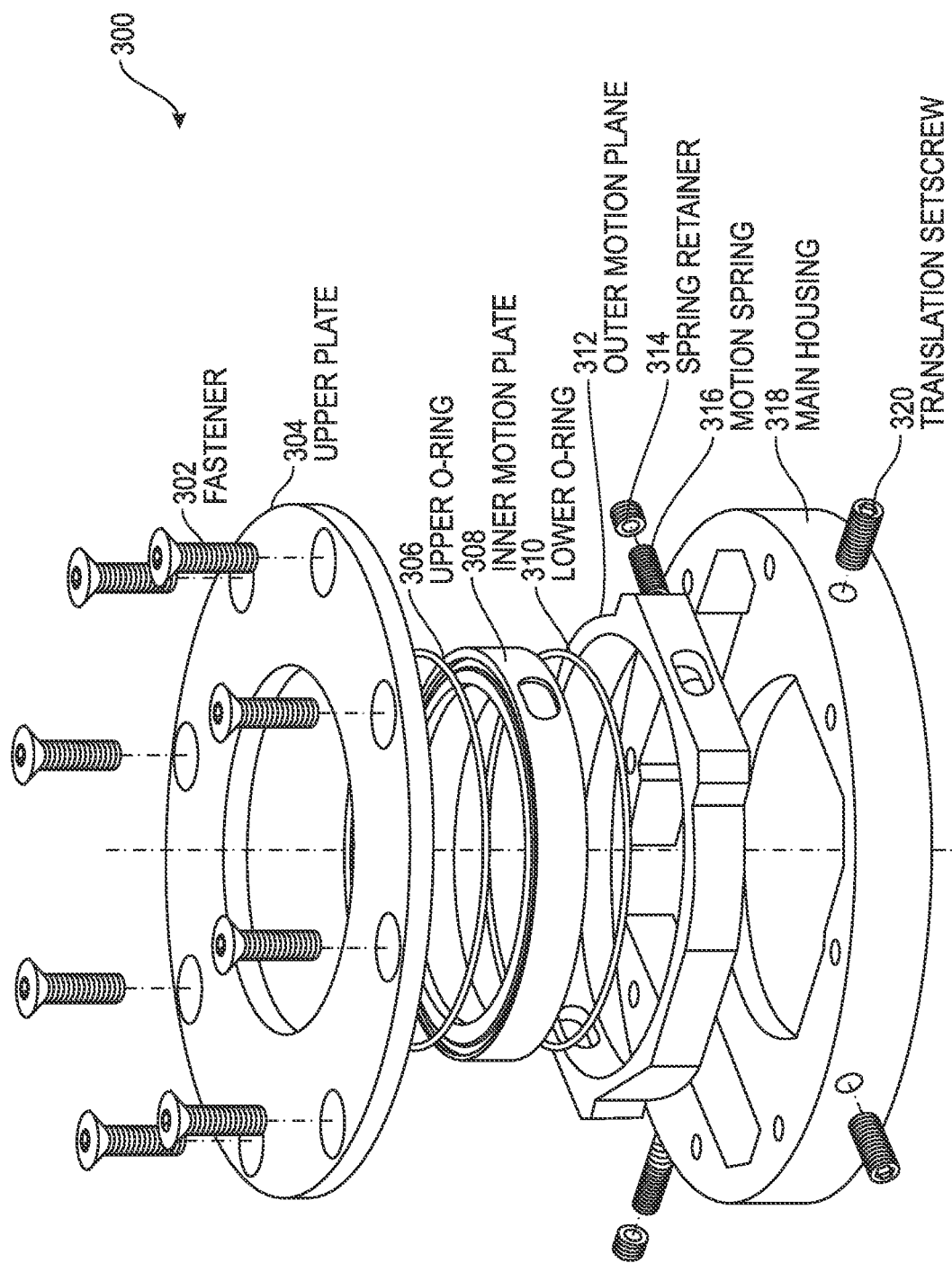
FIG. 3 shows an expanded view of the device of FIG. 2 in accordance with one or more embodiments.

Turning to FIG. 3, FIG. 3 illustrates an exploded view of various components of the laser beam alignment device (200) of FIG. 2 in accordance with one or more embodiments. As shown in FIG. 3, a laser beam alignment device (300) comprises a plurality of fasteners (302) holding an upper plate (304), which secures an upper O-ring (306), an inner motion plane (308), a lower O-ring (310), and an outer motion plane (312) into a main housing (318). In some embodiments, the laser beam alignment device (300) further comprises a plurality of translation setscrews (320), and a corresponding plurality of motion springs (316) of the translation setscrews (320) with opposing motions and spring retainers (314), which is used to both retain the motion springs (316) and set a pre-compression force along with a first axis and a second axis of the laser beam alignment assembly (101).

In some embodiments, the laser beam alignment device (300) aligns the laser beam (105) in the first axis and the second axis that are opposed at 90 degrees to each other, both the first and second axes being on a single plane (or mono-plane) created normal to an optical axis of the laser beam (105) of a laser beam alignment assembly to which the laser beam alignment device (300) is affixed. In one or more embodiments, the laser beam alignment device is designed to operate via means of one threaded translation setscrew per axis, coupled with opposing motion spring pressure. Alternatively, the device (300) may be assembled using two opposed translation setscrews for maximum stability in desired position. In addition, in one or more embodiments, the laser beam alignment device (300) includes a beam delivery component (not shown) attached to the inner motion plane (308), such that the beam delivery component allows for axial delivery of the laser beam (105) of the laser beam alignment assembly (101).

Figure 4:
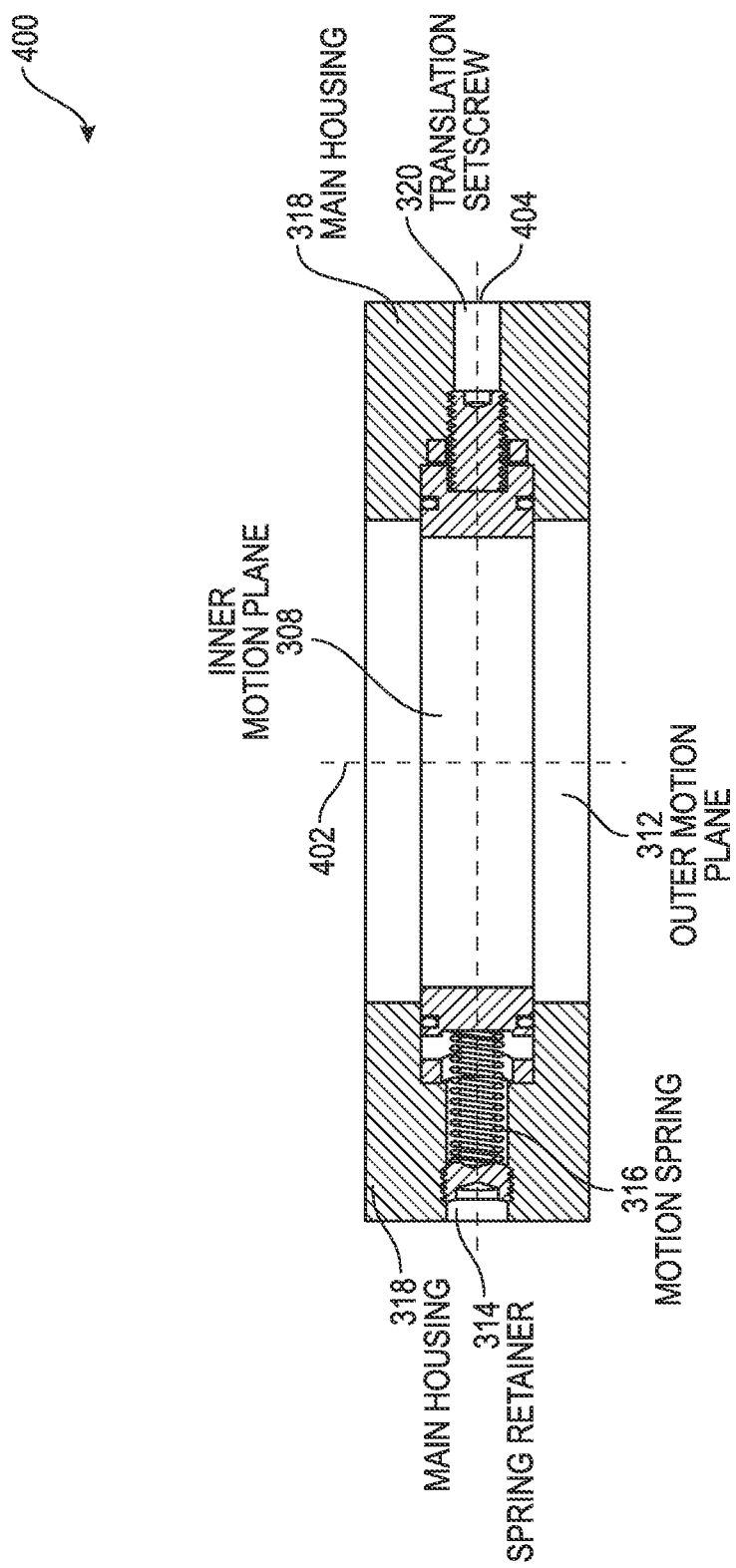
FIG. 4 shows a section view of the device of FIG. 3 in accordance with one or more embodiments.

Turning to FIG. 4, FIG. 4 shows a section view of the laser beam alignment device of FIG. 2 in accordance with one or more embodiments. As shown in FIG. 4, a section view (400) of the laser beam alignment device (300) illustrates the laser beam alignment device assembled in the motion spring-opposed translation setscrew configuration. In particular, the section view (400) shows a first axis (402) and a second axis (404), which is 90 degrees rotated from the first axis (402), and is the same as that shown in FIG. 3 except for the translation setscrew (320) and motion spring (316) located on the first axis (402) nested rings (306 and 310).

In some embodiments, as the translation setscrew (320) is rotated using a suitable tool, the translation setscrew (320) translates a directly-contacted nested rings, operating against compression pressure induced by the directly opposed motion spring (316), to translate the nested rings along a single axis. This does not affect the pointing stability of 90-degree rotated axis or the second axis (404). In one or more embodiments, the two moving parts of the laser beam alignment device (300) comprising the different axes (402 and 404) are manufactured in a way to key the moving parts together and into a base of the device (300), resulting in a mechanically stable and fixed 90-degree separation. In one or more embodiments, the assembled laser beam alignment device is also capable of being pressurized, due to O-ring (306 and 310) seals that operate both as friction-reducing components as well as gas/fluid sealing components.

As can be seen in FIG. 4, embodiments disclosed herein integrate both axes of motion into one plane, thereby providing a sealed aperture bisecting both axes, allowing for pressurization of the central cavity of the assembled device of FIG. 2. The laser beam alignment device (200, 300) is manufactured to hold tight tolerances that maintain the 90 degree separation of the axes of motion in a stable and unchanging manner.

In some embodiments, if the opposing-translation setscrew configuration is required/desired, the translation setscrew (320) and the motion spring (316) on one side are replaced with the same type/size translation setscrew as used on the opposing side of the nested rings, which includes the upper O-ring (306) and the lower O-ring (310). This configuration would allow for forced translation of the nested ring by removing compression on one side of the nested rings and increasing compression on the opposite side of the nested rings.

The inner-most nested lower O-ring (310) ring is internally threaded to allow affixing of mating beam path components. In addition, the laser beam alignment device has a plurality of locating/fastening holes on the external body of the device to allow affixing to the mating beam path components which continue the beam delivery path. This allows the beam path component affixed to the inner, lower O-ring (310) to be translated in two 90-degree opposed dimensions relative to the optical axis of the laser beam alignment assembly, while maintaining pointing stability, and while maintaining beam path purity from unwanted contaminants, both during adjustment as well as during periods of laser processing.

Figure 5:
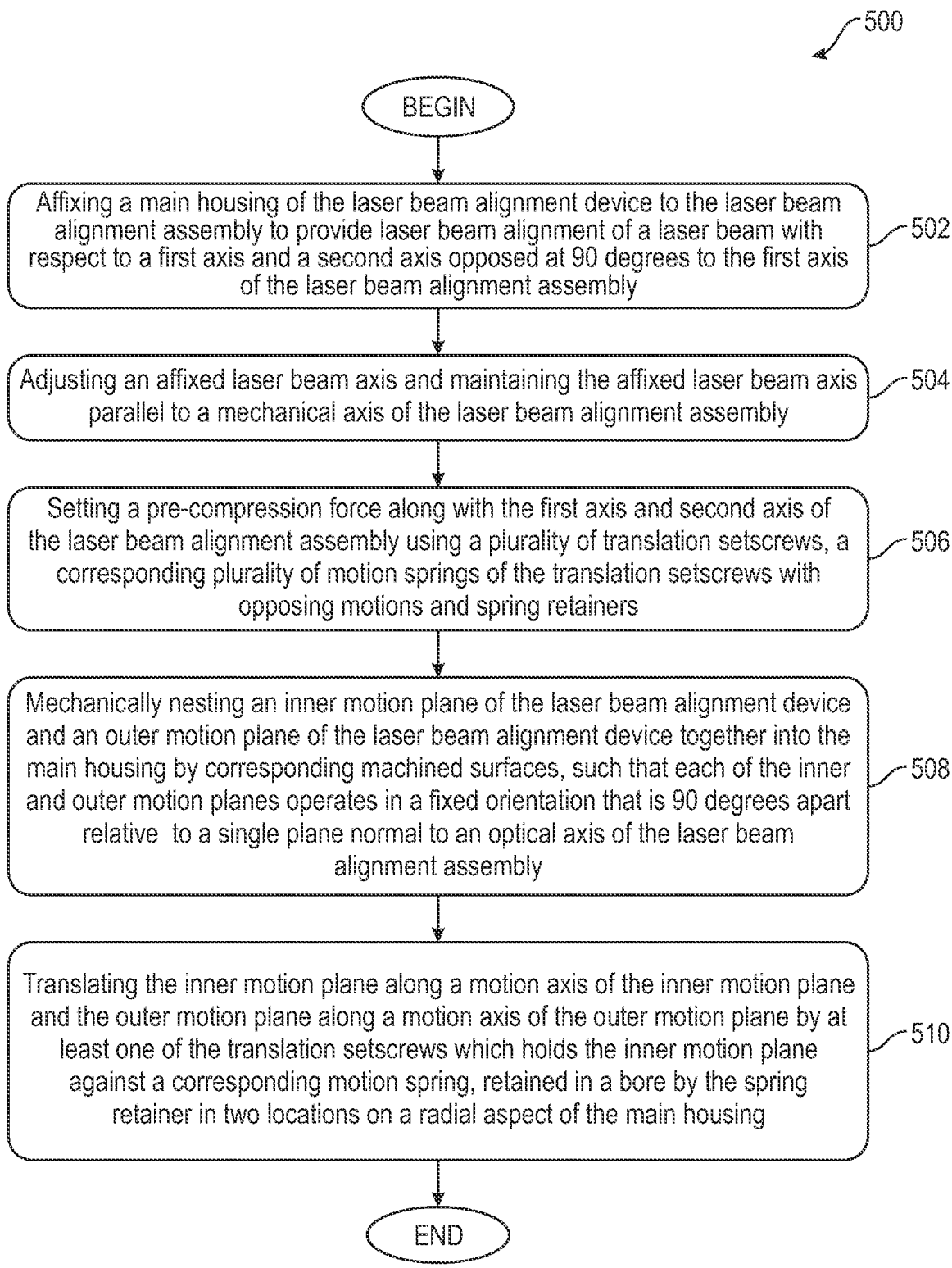
FIG. 5 shows a flowchart in accordance with one or more embodiments.

FIG. 5 shows a flowchart (500) in accordance with one or more embodiments.

Specifically, FIG. 5 describes a general method for a laser beam alignment assembly. One or more steps in FIG. 5 may be performed by one or more components (for example, laser beam alignment device (110)) as described in FIGS. 1-3. While the various steps in FIG. 5 are presented and described sequentially, one of ordinary skill in the art will appreciate that some or all of the steps may be executed in different orders, may be combined or omitted, and some or all of the steps may be executed in parallel. Furthermore, the steps may be performed actively or passively. The method may be repeated or expanded to support multiple components and/or multiple users within a field environment. Accordingly, the scope of the invention should not be considered limited to the specific arrangement of steps shown in the flowchart.

In step 502, a main housing of the laser beam alignment device is affixed to the laser beam alignment assembly in accordance with one or more embodiments. For example, a main housing (for example, main housing (208)) of the laser beam alignment device (for example, laser beam alignment device (200)) affixed to a laser beam alignment assembly (for example, laser beam alignment assembly (101)) provide a laser beam alignment of a laser beam (for example, laser beam (105)) with respect to a first axis and a second axis opposed at 90 degrees to the first axis of the laser beam alignment assembly described previously in FIGS. 2-4 and the accompanying description.

In step 504, the laser beam alignment device adjusts an affixed laser beam axis in accordance with one or more embodiments. Thus, the laser beam alignment device maintains the affixed laser beam axis parallel to mechanical axis of the laser beam alignment assembly to which the laser beam alignment device is attached described previously in FIGS. 3-4 and the accompanying description.

In step 506, a pre-compression force is set along with the first axis and the second axis of the laser beam alignment assembly using a plurality of translation setscrews (for example, translation setscrew (320)), a corresponding plurality of motion springs (for example, motion spring (316)) of the translation setscrews with opposing motions and spring retainers (for example, spring retainer (314)) described previously in FIGS. 3-4 and the accompanying description.

In step 508, an inner motion plane (for example, inner motion plane (308)) of the laser beam alignment device and an outer motion plane (for example, outer motion plane (312)) of the laser beam alignment device are mechanically nested together into the main housing by corresponding machined surfaces in accordance with one or more embodiments. As a result, each of the inner and outer motion planes operates in a fixed orientation that is 90 degrees apart relative to a single plane normal to an optical axis of the laser beam alignment assembly described previously in FIGS. 3-4 and the accompanying description. In addition, a beam delivery component is attached to the inner motion plane, such that the beam delivery component allows for axial delivery of the laser beam (105).

In step 510, the inner motion plane along a motion axis of the inner motion plane and the outer motion plane along a motion axis of the outer motion plane are translated by at least one of the translation setscrews which holds the inner motion plane against a corresponding motion spring, retained in a bore by the spring retainer in two locations on a radial aspect of the main housing of the laser beam alignment device. In other words, the laser beam alignment device integrates both axes of motion into one plane or mon-plane. In some embodiments, the laser beam alignment device provides a sealed aperture bisecting both axes of motion and allowing for the beam path pressurization of a central cavity of the laser beam alignment device.

Figure 6A:
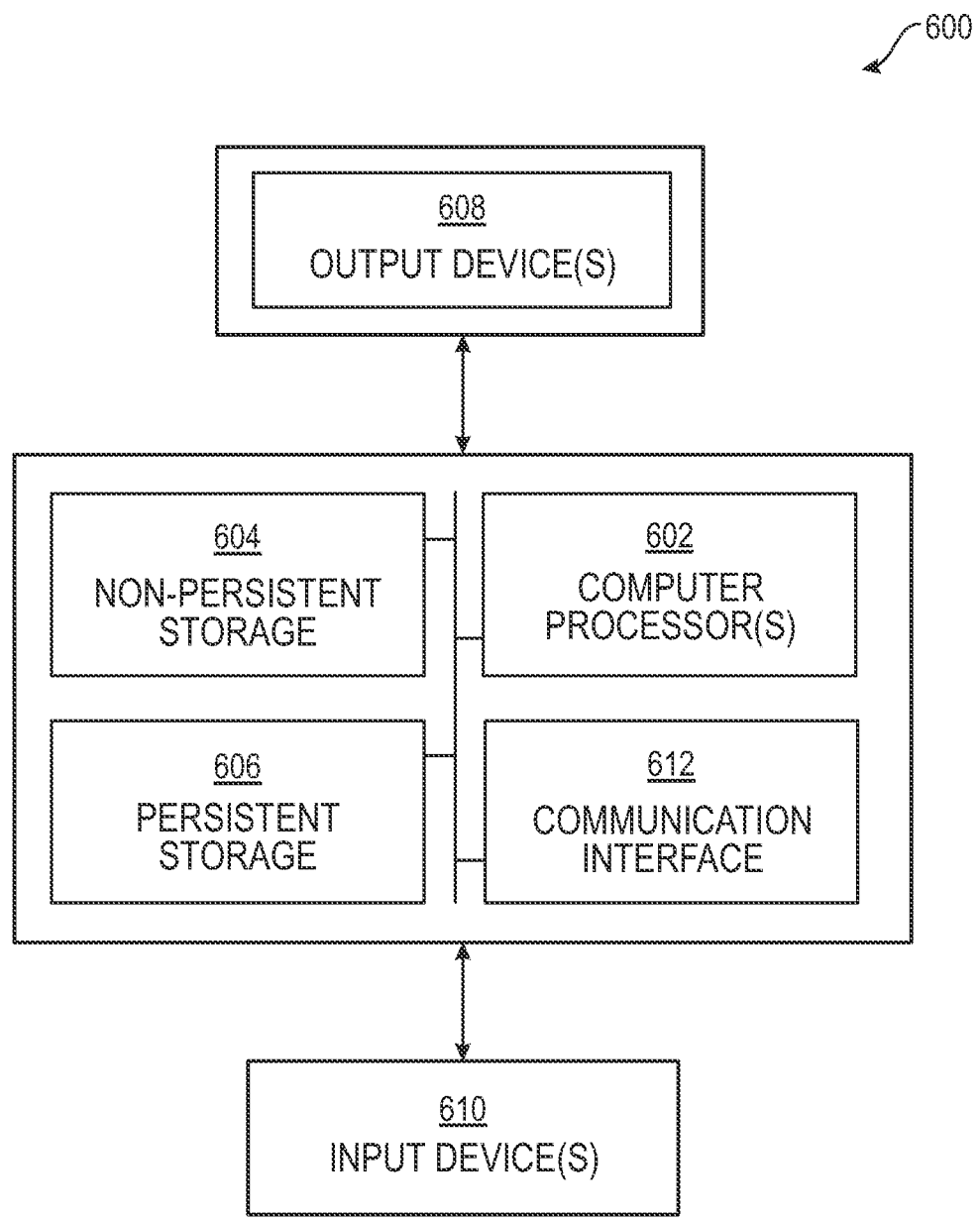
FIGS. 6A and 6B show a computing system in accordance with one or more embodiments.

The subject matter described in one or more embodiments above may be implemented in a computing system. For example, computing system 114 of FIG. 1 may be implemented as a computer system shown in FIG. 6. FIG. 6 shows a computing system in accordance with one or more embodiments of the invention. Any combination of mobile, desktop, server, router, switch, embedded device, or other types of hardware may be used. For example, as shown in FIG. 6A, the computing system (600) may include one or more computer processors (602), non-persistent storage (604) (for example, volatile memory, such as random access memory (RAM), cache memory), persistent storage (606) (for example, a hard disk, an optical drive such as a compact disk (CD) drive or digital versatile disk (DVD) drive, a flash memory), a communication interface (612) (for example, Bluetooth interface, infrared interface, network interface, optical interface), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, or electronic pen.

The communication interface (612) may include an integrated circuit for connecting the computing system (600) to a network (not shown) (for example, a local area network (LAN), a wide area network (WAN), such as the Internet, mobile network, or any other type of network) or to another device, such as another computing device.

Further, the computing system (600) may include one or more output devices (608), such as a screen (for example, a liquid crystal display (LCD), a plasma display, touchscreen, cathode ray tube (CRT) monitor, or projector), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s) is configured to perform one or more embodiments of the disclosure.

Figure 6B:
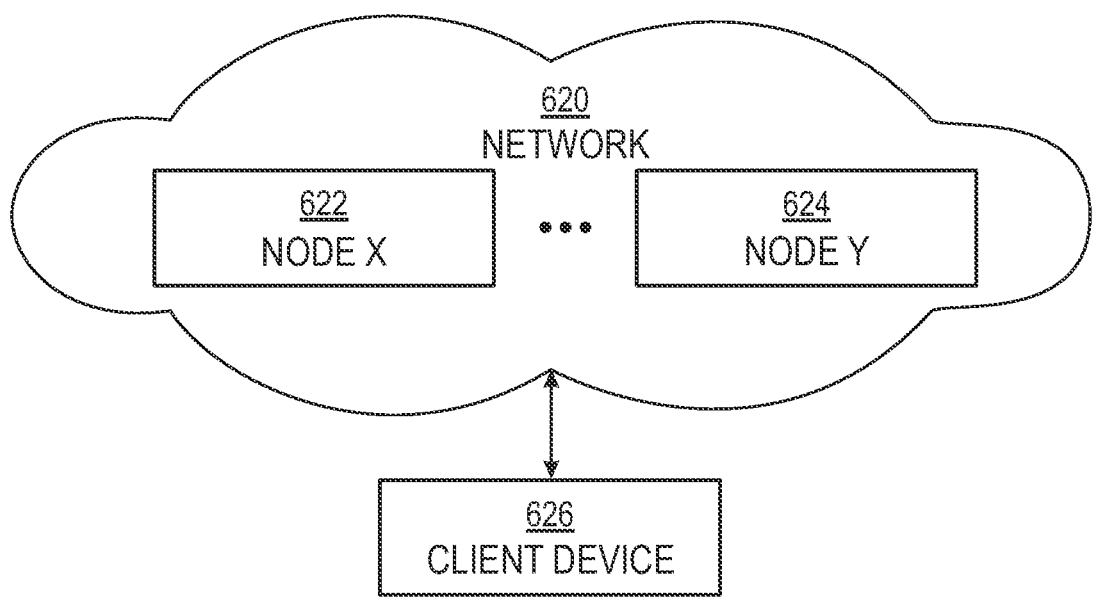

The computing system (600) in FIG. 6A may be connected to or be a part of a network. For example, as shown in FIG. 6B, the network (620) may include multiple nodes (for example, node X (622), node Y (624)). Each node may correspond to a computing system, such as the computing system shown in FIG. 6A, or a group of nodes combined may correspond to the computing system shown in FIG. 6A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory or resources.

The nodes (for example, node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include or perform all or a portion of one or more embodiments of the disclosure.

The computing system or group of computing systems described in FIGS. 6A and 6B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided in subsequent paragraphs.

Based on the client-server networking model, sockets may serve as interfaces or communication channel endpoints enabling bidirectional data transfer between processes on the same device. Foremost, following the client-server networking model, a server process (for example, a process that provides data) may create a first socket object. Next, the server process binds the first socket object, thereby associating the first socket object with a unique name or address. After creating and binding the first socket object, the server process then waits and listens for incoming connection requests from one or more client processes (for example, processes that seek data). At this point, when a client process wishes to obtain data from a server process, the client process starts by creating a second socket object. The client process then proceeds to generate a connection request that includes at least the second socket object and the unique name or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (for example, bytes).

Shared memory refers to the allocation of virtual memory space in order to substantiate a mechanism for which data may be communicated or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the selection by the user.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the selection by the user. Further to the above example, the data received from the server after selecting the URL link may provide a web page in Hyper Text Markup Language (HTML) that may be rendered by the web client and displayed on the user device.

Once data is obtained, such as by using techniques described previously or from storage, the computing system, in performing one or more embodiments of the disclosure, may extract one or more data items from the obtained data. For example, the extraction may be performed as follows by the computing system (600) in FIG. 6A. First, the organizing pattern (for example, grammar, schema, layout) of the data is determined, which may be based on one or more of the following: position (for example, bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6A, while performing one or more embodiments of the disclosure, may perform data comparison. Data comparison may be used to compare two or more data values (for example, A, B). For example, one or more embodiments may determine whether A>B, A=B, A!=B, A<B, etc. The comparison may be performed by submitting A, B, and an opcode specifying an operation related to the comparison into an arithmetic logic unit (ALU) (that is, circuitry that performs arithmetic or bitwise logical operations on the two data values). The ALU outputs the numerical result of the operation or one or more status flags related to the numerical result. For example, the status flags may indicate whether the numerical result is a positive number, a negative number or zero. By selecting the proper opcode and then reading the numerical results or status flags, the comparison may be executed. For example, in order to determine if A>B, B may be subtracted from A (that is, A−B), and the status flags may be read to determine if the result is positive (that is, if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6A may implement or be connected to a data repository. For example, one type of data repository is a database. A database is a collection of information configured for ease of data retrieval, modification, re-organization, and deletion. Database management system (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (for example, join, full join, count, average), sort (for example, ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to present raw or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, for example, data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, for example, by obtaining data from a data attribute within the data object that identifies the data object type. Then, the GUI may determine any rules designated for displaying that data object type, for example, rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The previous description of functions presents only a few examples of functions performed by the computing system of FIG. 6A and the nodes or client device in FIG. 6B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims.

What is claimed is:

1. A mono-planar sealed laser beam alignment device, comprising:
a plurality of fasteners holding an upper plate;
an upper O-ring;
a lower O-ring;
an inner motion plane;
an outer motion plane; and
a main housing affixed to a laser beam alignment assembly, the laser beam alignment device configured to provide laser beam alignment with respect to a first axis and a second axis opposed at 90 degrees to the first axis of the laser beam alignment assembly,
wherein the first axis and the second axis on a single plane are normal to an optical axis of a laser beam of the laser beam alignment assembly, and
wherein the plurality of fasteners secure the upper O-ring, the inner motion plane, the lower O-ring, and the outer motion plane into the main housing, creating beam path pressurization by the laser beam alignment device.

2. The laser beam alignment device according to claim 1, further comprising a plurality of translation setscrews, a corresponding plurality of motion springs of the translation setscrews with opposing motions and spring retainers.

3. The laser beam alignment device according to claim 2, wherein the plurality of translation setscrews and the spring retainers are used to both retain the motion springs and set a pre-compression force along with the first axis and the second axis of the laser beam alignment assembly.

4. The laser beam alignment device according to claim 1, further comprising: a beam delivery component attached to the inner motion plane, wherein the beam delivery component allows for axial delivery of the laser beam.

5. The laser beam alignment device according to claim 1, wherein an affixed laser beam axis of the laser beam alignment assembly is adjusted and maintained parallel to a mechanical axis of the laser beam alignment assembly.

6. The laser beam alignment device according to claim 1, wherein the inner motion plane and the outer motion plane are mechanically nested together into the main housing by corresponding machined surfaces such that each motion plane operates in a fixed orientation that is 90 degrees apart relative to the single plane normal to the optical axis of the laser beam alignment assembly.

7. The laser beam alignment device according to claim 1, wherein the inner motion plane and the outer motion plane are sealed into the main housing by the upper plate.

8. The laser beam alignment device according to claim 1, wherein the laser beam alignment assembly is sealed for gas or fluid separation from a beam path to outer areas by the beam pressurization due to the upper O-ring and the lower O-ring.

9. A laser beam alignment assembly, comprising:
a laser diode with a laser control to control a laser beam;
a plurality of focusing lenses;
a data acquisition system;
a computing system coupled to the data acquisition system; and
a laser beam alignment device coupled to a detector, an amplifier with a resonant filter, and the data acquisition system, wherein the laser beam alignment device comprises:
a plurality of fasteners holding an upper plate;
an upper O-ring;
a lower O-ring;
an inner motion plane;
an outer motion plane; and
a main housing affixed to the laser beam alignment assembly and configured to provide laser beam alignment with respect to a first axis and a second axis opposed at 90 degrees to the first axis of the laser beam alignment assembly;
wherein the first axis and the second axis on a single plane are normal to an optical axis of a laser beam of the laser beam alignment assembly, and
wherein the plurality of fasteners secure the upper O-ring, the inner motion plane, the lower O-ring, and the outer motion plane into the main housing, creating beam path pressurization.

10. The assembly according to claim 9, wherein the laser beam alignment device allows adjustment of an affixed laser beam axis and maintains the affixed laser beam axis parallel to a mechanical axis of the laser beam alignment assembly.

11. The assembly according to claim 9, the inner motion plane and the outer motion plane are mechanically nested together into the main housing by corresponding machined surfaces such that each motion plane operates in a fixed orientation that is 90 degrees apart relative to the single plane normal to the optical axis of the laser beam alignment assembly.

12. The assembly according to claim 9, wherein the laser beam alignment device further comprises a plurality of translation setscrews, a corresponding plurality of motion springs of the translation setscrews with opposing motions and spring retainers.

13. The assembly according to claim 12, wherein the plurality of translation setscrews and the spring retainers are used to both retain the motion springs and set a pre-compression force along with the first axis and the second axis of the laser beam alignment assembly.

14. The assembly according to claim 9, wherein the laser beam alignment device further comprises: a beam delivery component attached to the inner motion plane, wherein the beam delivery component allows for axial delivery of the laser beam.

15. The assembly according to claim 9, wherein the inner motion plane and the outer motion plane are sealed into the main housing by the upper plate.

16. The assembly according to claim 9, wherein the laser beam alignment assembly is sealed for gas or fluid separation from a beam path to outer areas by the beam path pressurization due to the upper O-ring and the lower O-ring.

17. A method for a laser beam alignment assembly using a laser beam alignment device, the method comprising:
affixing a main housing of the laser beam alignment device to the laser beam alignment assembly to provide laser beam alignment of a laser beam with respect to a first axis and a second axis opposed at 90 degrees to the first axis of the laser beam alignment assembly;
adjusting an affixed laser beam axis and maintaining the affixed laser beam axis parallel to a mechanical axis of the laser beam alignment assembly;
setting a pre-compression force along with the first axis and the second axis of the laser beam alignment assembly, using a plurality of translation setscrews, a corresponding plurality of motion springs of the translation setscrews with opposing motions and spring retainers; and
mechanically nesting an inner motion plane of the laser beam alignment device and an outer motion plane of the laser beam alignment device together into the main housing by corresponding machined surfaces, such that each of the inner and outer motion planes operates in a fixed orientation that is 90 degrees apart relative to a single plane normal to an optical axis of the laser beam alignment assembly.

18. The method of claim 17, wherein the laser beam alignment device further comprises:
a plurality of fasteners holding an upper plate,
an upper O-ring, and
a lower O-ring, wherein the method further comprises:
securing the upper O-ring, the inner motion plane, the lower O-ring, and the outer motion plane into the main housing by the plurality of fasteners, thereby creating beam path pressurization in the laser beam alignment device.

19. The method according to claim 17, further comprising: translating the inner motion plane along a motion axis of the inner motion plane and the outer motion plane along a motion axis of the outer motion plane by at least one of the translation setscrews which holds the inner motion plane against a corresponding motion spring, retained in a bore by the spring retainer in two locations on a radial aspect of the main housing.

20. The method according to claim 17, further comprising sealing the laser beam alignment assembly for gas or fluid separation from a beam path to outer areas by the beam path pressurization due to the upper O-ring and the lower O-ring.

* * * * *